(12) United States Patent  (10) Patent No.: US 9,173,030 B2
Suzuki et al.  (45) Date of Patent: Oct. 27, 2015

(54) SPEAKER SYSTEM AND SPEAKER DRIVING METHOD

(75) Inventors: Nobukazu Suzuki, Kanagawa (JP); Yoshio Ohashi, Kanagawa (JP); Akihisa Inatani, Kanagawa (JP); Yasuo Osada, Saitama (JP); Terutaka Yana, Tokyo (JP); Yutaka Miki, Chiba (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 12/556,017

(22) Filed: Sep. 9, 2009

(65) Prior Publication Data

US 2010/0067726 A1 Mar. 18, 2010

(30) Foreign Application Priority Data

Sep. 9, 2008 (JP) ................................ 2008-230391
Dec. 19, 2008 (JP) ................................ 2008-323420

(51) Int. Cl.
 *H04R 1/02* (2006.01)
 *H04R 5/02* (2006.01)
 *G06F 1/16* (2006.01)
 *H04R 1/26* (2006.01)
 *H04R 7/04* (2006.01)
 *H04R 17/00* (2006.01)

(52) U.S. Cl.
 CPC ................ *H04R 5/02* (2013.01); *G06F 1/1605* (2013.01); *H04R 1/26* (2013.01); *H04R 7/045* (2013.01); *H04R 17/00* (2013.01); *H04R 2440/05* (2013.01); *H04R 2499/15* (2013.01)

(58) Field of Classification Search
 CPC .................................. H04R 7/045; H04R 1/26
 USPC ................... 381/333, 152, 431, 182; 345/173
 See application file for complete search history.

(56) References Cited

U.S. PATENT DOCUMENTS

| | | | |
|---|---|---|---|
| 5,342,989 A * | 8/1994 | Barcus ........................... | 84/730 |
| 7,639,826 B1 * | 12/2009 | Azima et al. .................. | 381/152 |
| 2005/0047616 A1 * | 3/2005 | Lee ................................ | 381/152 |
| 2005/0185801 A1 * | 8/2005 | McCarty et al. ............... | 381/87 |
| 2006/0023898 A1 | 2/2006 | Katz | |
| 2006/0232564 A1 * | 10/2006 | Nishimura et al. ............ | 345/173 |
| 2007/0080951 A1 * | 4/2007 | Maruyama et al. ........... | 345/173 |
| 2007/0115619 A1 * | 5/2007 | Wang et al. ................... | 361/679 |
| 2007/0177746 A1 * | 8/2007 | Kobayashi et al. ........... | 381/152 |
| 2007/0209173 A1 * | 9/2007 | Hira et al. ..................... | 29/25.35 |
| 2007/0223747 A1 * | 9/2007 | Torisaki et al. ............... | 381/182 |
| 2008/0285778 A1 * | 11/2008 | Kuroda et al. ................ | 381/152 |
| 2009/0034759 A1 * | 2/2009 | Ko et al. ........................ | 381/152 |

FOREIGN PATENT DOCUMENTS

| | | |
|---|---|---|
| JP | 04-313999 | 11/1992 |
| JP | 5-111096 A | 4/1993 |
| JP | 2001-189978 A | 7/2001 |
| JP | 2003-244784 A | 8/2003 |

(Continued)

*Primary Examiner* — Duc Nguyen
*Assistant Examiner* — Phan Le
(74) *Attorney, Agent, or Firm* — Wolf, Greenfield & Sacks, P.C.

(57) ABSTRACT

A speaker system includes: a display panel having a display screen; a structure having a plate part functioning as an acoustic diaphragm located outside of a perimeter of the display screen and being supported by the display panel; and an actuator attached to the structure so that a displacement direction of the actuator may be a direction of a plate surface of the plate part.

17 Claims, 19 Drawing Sheets

(56) References Cited

FOREIGN PATENT DOCUMENTS

| | | |
|---|---|---|
| JP | 2005-177688 | 7/2005 |
| JP | 2005-197868 A | 7/2005 |
| JP | 2006-513656 A | 4/2006 |
| JP | 2007-104602 | 4/2007 |
| JP | 2007-166027 | 6/2007 |
| JP | 2007-208948 A | 8/2007 |
| JP | 2007-214917 A | 8/2007 |
| JP | 2007-267302 A | 10/2007 |
| JP | 2008-177980 | 7/2008 |
| WO | WO 2006/038176 A1 | 4/2006 |
| WO | WO 2006/114985 A1 | 11/2006 |
| WO | WO 2009/017280 A1 | 2/2009 |

* cited by examiner

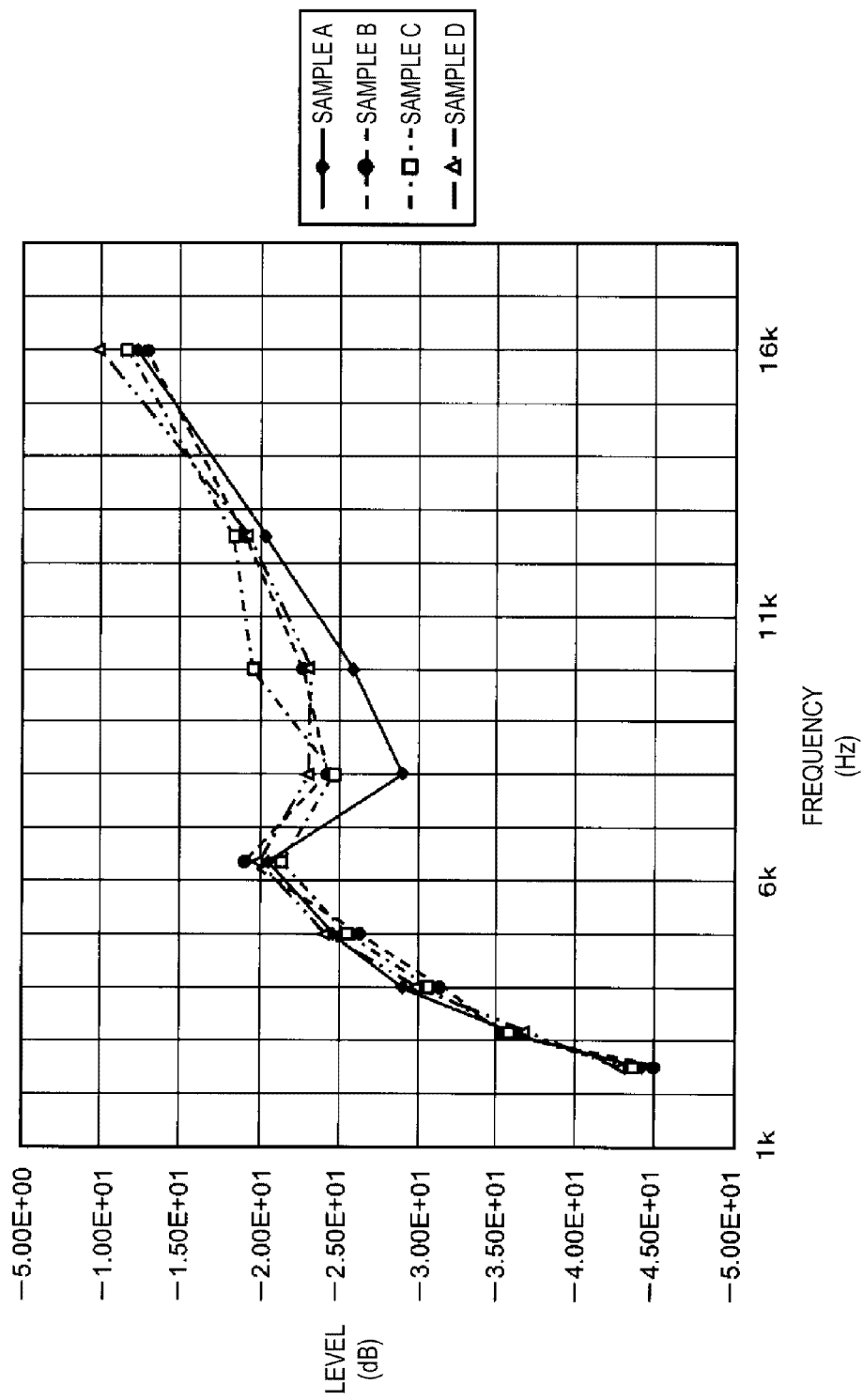

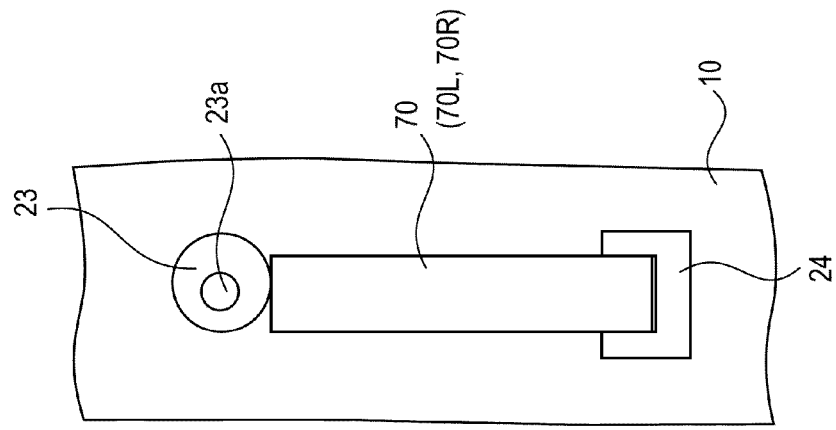
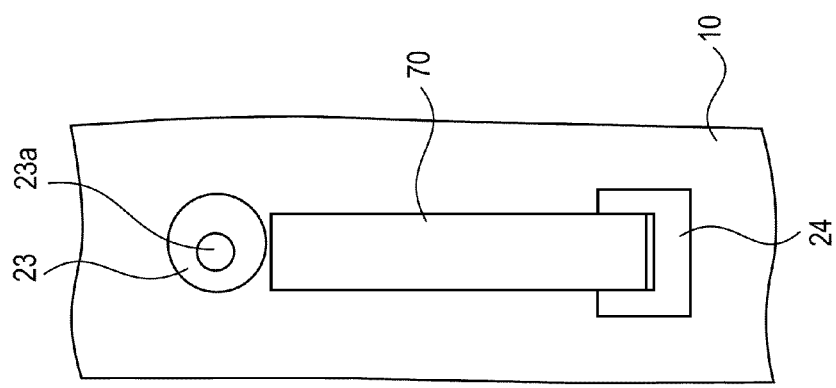
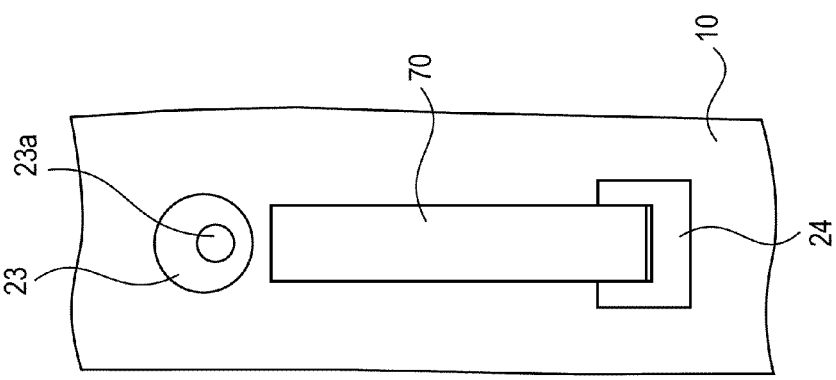

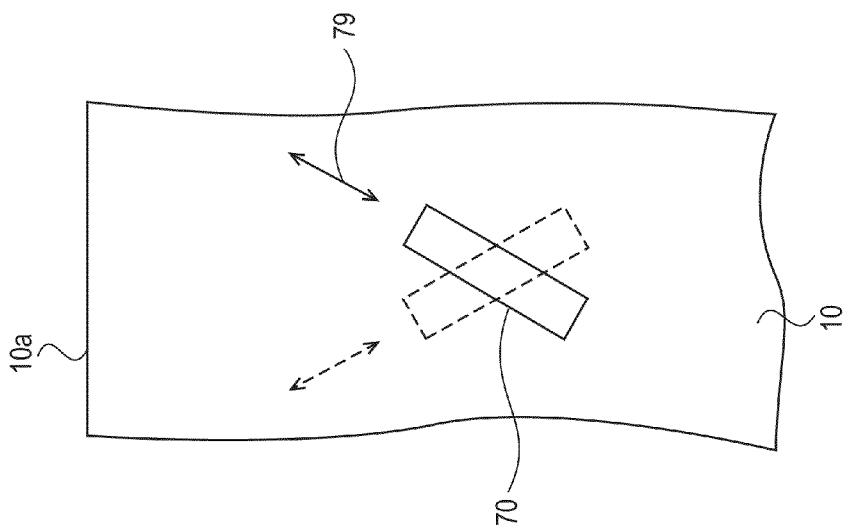
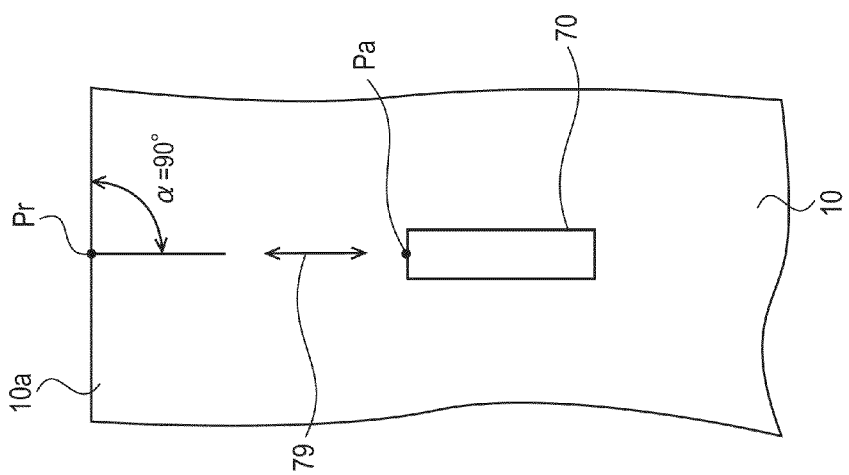

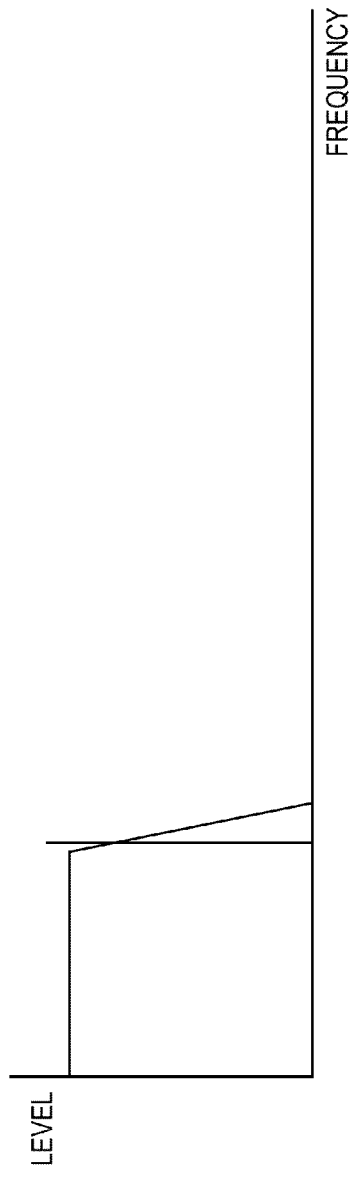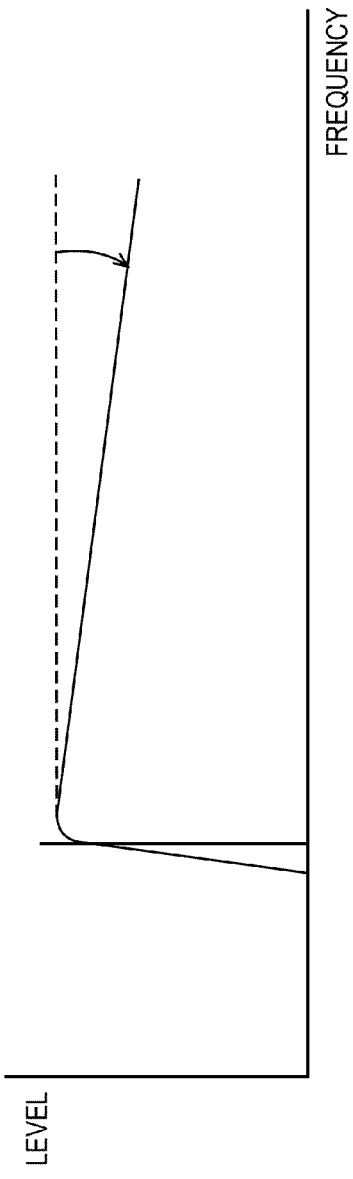

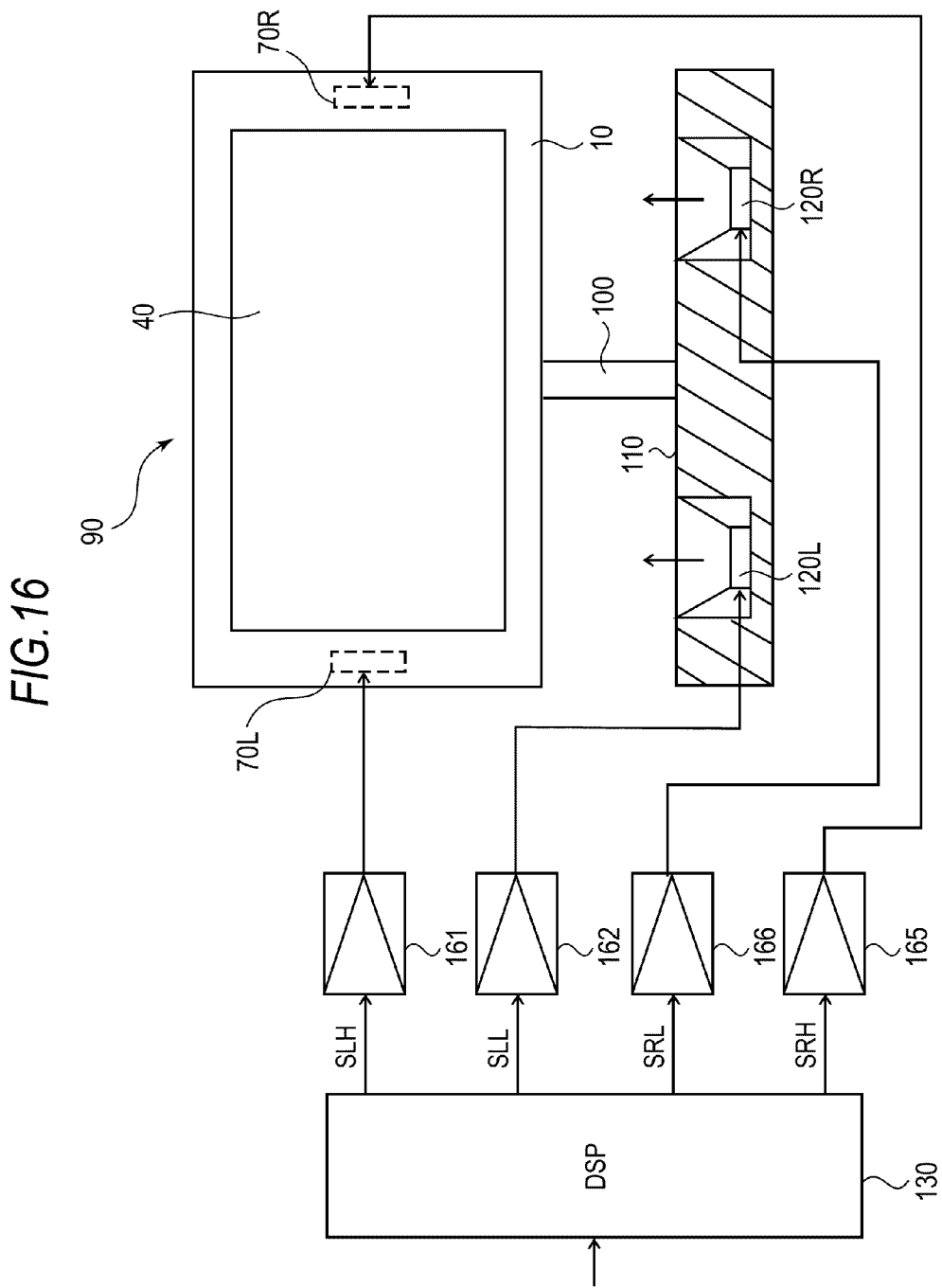

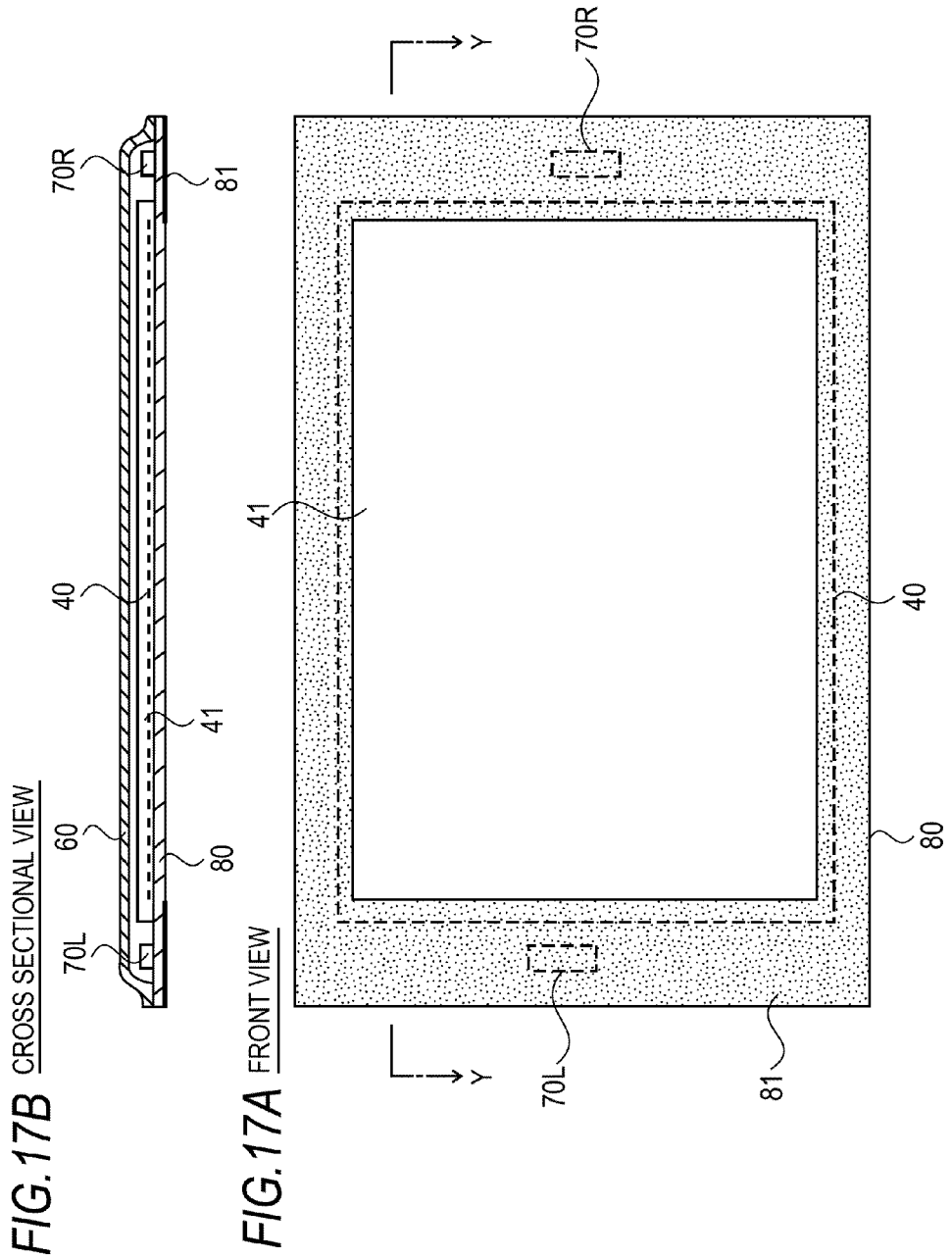

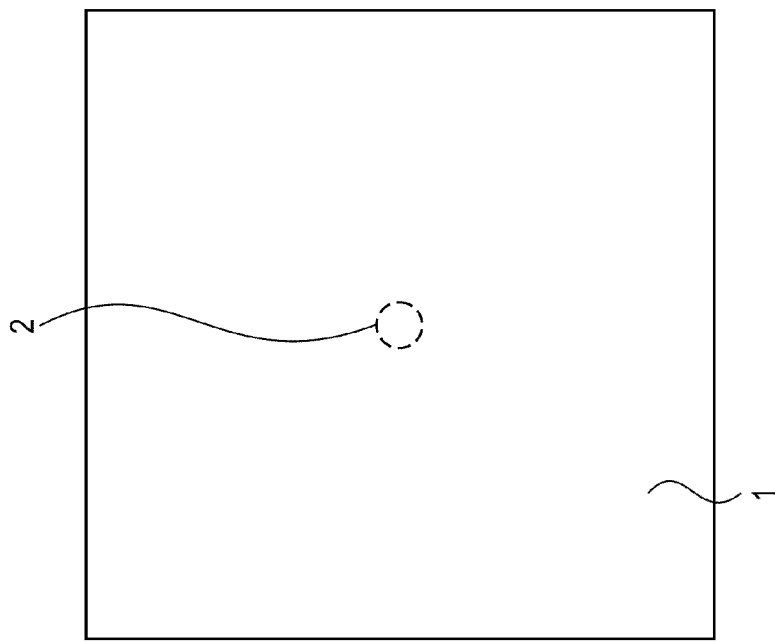
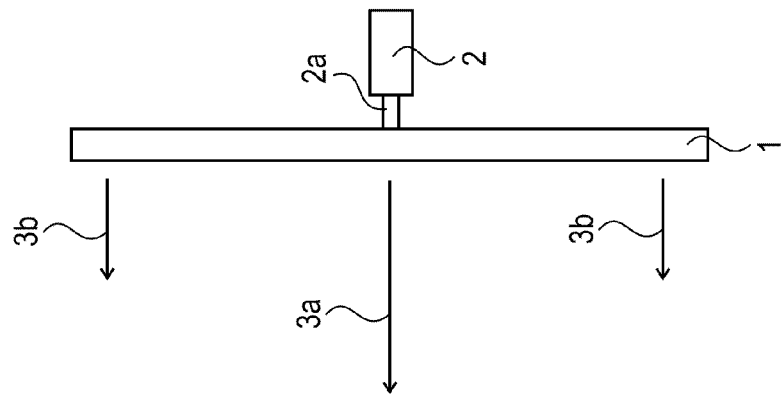

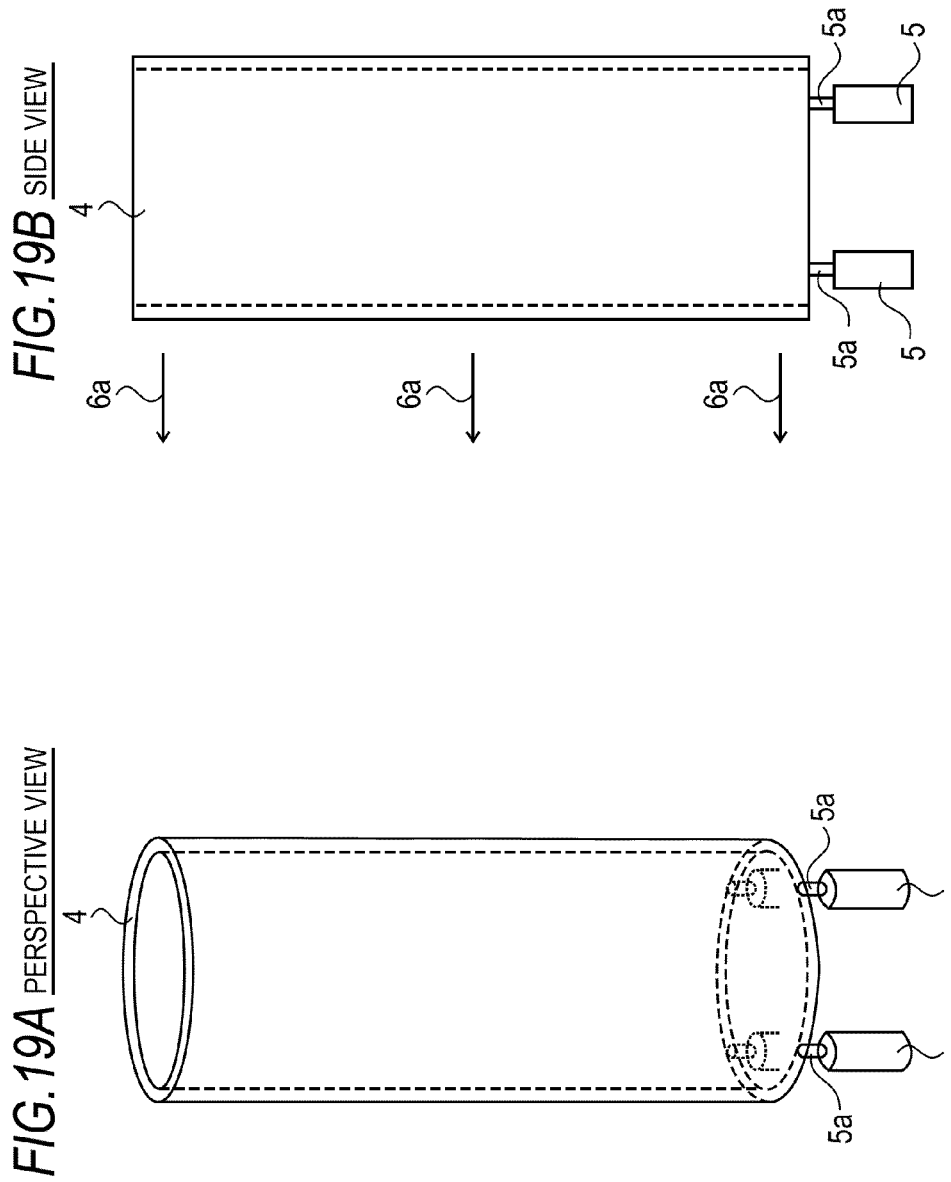

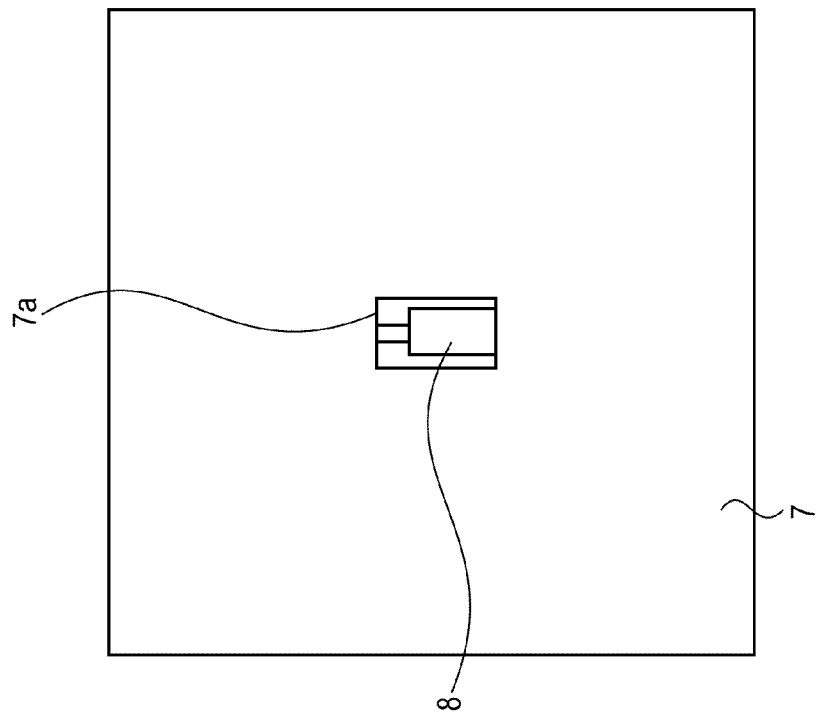
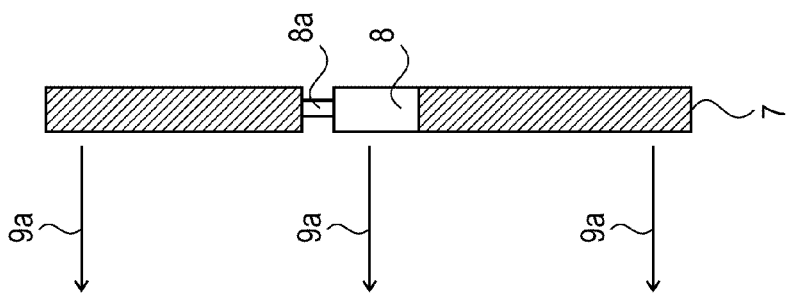

SPEAKER SYSTEM AND SPEAKER DRIVING METHOD

BACKGROUND OF THE INVENTION

1. Field of the Invention

The present invention relates to a speaker system integrated with a display panel such as an image display audio output unit of a thin screen television receiver, and a method of driving the speaker system.

2. Background Art

Television receivers are becoming thinner and thinner. In October 2007, the applicant released a television receiver with a display panel part having a thickness of 3 mm using an organic EL display.

On the other hand, not typical speaker units having voice coils and cones, but speaker devices of generating sound by applying vibration to acoustic diaphragms using actuators such as super-magnetostrictive actuators have been conceived.

Specifically, JP-A-4-313999 and JP-A-2005-177688 disclose speaker devices as shown in FIGS. 18A and 18B.

In the speaker device in FIGS. 18A and 18B, a drive rod 2a of a super-magnetostrictive actuator 2 is brought into contact with the center part of a flat-plate acoustic diaphragm 1 so that its displacement direction may be perpendicular to the surface of the acoustic diaphragm 1, and thereby, the acoustic diaphragm 1 is vibrated in the direction perpendicular to the surface.

However, in the speaker device in FIGS. 18A and 18B, the amplitude of vibration becomes the maximum at the center part of the acoustic diaphragm 1 as shown by an arrow 3a and the amplitude of vibration becomes the minimum at the point apart from the point where the vibration is applied as shown by an arrow 3b. Thus, the vibration of the acoustic diaphragm 1 is inhomogeneous in the respective parts.

On the other hand, JP-A-2007-166027 discloses a speaker device as shown in FIGS. 19A and 19B.

In the speaker device in FIGS. 19A and 19B, a cylindrical acoustic diaphragm 4 is vertically supported, plural actuators 5 such as super-magnetostrictive actuators are provided at the lower end surface of the acoustic diaphragm 4 and drive rods 5a of the respective actuators are brought into contact with the lower end surface of the acoustic diaphragm 4, and thereby, the acoustic diaphragm 4 is vibrated in the direction perpendicular to the lower end surface.

In the speaker device in FIGS. 19A and 19B, the lower end surface of the acoustic diaphragm 4 is excited by longitudinal wave, vibration elastic wave propagates in the direction of the surface of the acoustic diaphragm 4, and the longitudinal wave and the lateral wave are mixed. Thus, sound wave is radiated by the lateral wave in the direction perpendicular to the surface of the acoustic diaphragm 4.

Accordingly, in the speaker device in FIGS. 19A and 19B, sound wave is radiated at the homogeneous level in any location in the axial direction of the acoustic diaphragm 4 as shown by an arrow 6a, and a sound image homogeneously localized over the entire acoustic diaphragm 4.

SUMMARY OF THE INVENTION

Commonly-owned JP-A-2009-130663 discloses a speaker device as shown in FIGS. 20A and 20B.

In the speaker device in FIGS. 20A and 20B, a rectangle hole 7a is formed in a flat-plate acoustic diaphragm 7, an actuator 8 having a drive rod 8a is fit in the rectangle hole 7a, and thereby, vibration in the direction of the surface is applied to the acoustic diaphragm 7.

In the speaker device in FIGS. 20A and 20B, the sound wave is radiated at the homogeneous level in any part of the acoustic diaphragm 7 as shown in an arrow 9a as is the case of the speaker device in FIGS. 19A and 19B.

Further, in the speaker device in FIGS. 20A and 20B, the thickness of the speaker may be made as thin as the thickness of the acoustic diaphragm 7.

As described above, when the display panel part is made thin to about several millimeters or less, it is difficult to incorporate a typical speaker unit in the display panel part and maintain the thickness of the display panel part to about several millimeters or less.

When the speaker device of vibrating the acoustic diaphragm 1 in the direction perpendicular to the plate surface as shown in FIGS. 18A and 18B is incorporated in the display panel part, the direction of the length of the super-magnetostrictive actuator 2 is perpendicular to the panel surface, and it is also difficult to maintain the thickness of the display panel part to about several millimeters or less.

Accordingly, it is desirable to make a thickness of a display part sufficiently small in a speaker system integrated with a display panel.

A speaker system according to an embodiment of the invention includes a display panel having a display screen, a structure having a plate part functioning as an acoustic diaphragm located outside of a perimeter of the display screen and being supported by the display panel, and an actuator attached to the structure so that a displacement direction of the actuator may be a direction of a plate surface of the plate part.

In the speaker system according to the embodiment of the invention, for example, the actuator is attached to each of locations at the left side and the right side of the display screen of the structure having a casing board shape so that a length direction of each actuator may be a direction of a plate surface of the structure.

Accordingly, even when the length of the actuator as a vibrating part is great, the thickness of the display panel part can be made sufficiently small.

As described above, according to the embodiment of the invention, the thickness of the display panel part of the speaker system integrated with the display panel can be made sufficiently small.

BRIEF DESCRIPTION OF THE DRAWINGS

FIG. 5 shows differences in frequency characteristics depending on individual differences of the bezel.

FIGS. 7A to 7C show an example of a speaker system when a pre-load is applied to the laminated piezoelectric actuator.

FIGS. 10A and 10B are diagrams for explanation of a difference between the first embodiment and the second embodiment.

FIGS. 15A and 15B show examples of frequency characteristics of filters in FIG. 14.

FIG. 16 shows another example of the speaker system of the fourth embodiment.

FIGS. 17A and 17B show an example of a speaker system of an embodiment of the invention.

FIGS. 18A and 18B show a speaker device shown in JP-A-4-313999 and JP-A-2005-177688.

FIGS. 19A and 19B show a speaker device shown in JP-A-2007-166027.

FIGS. 20A and 20B show a speaker device shown in commonly-owned JP-A-2009-130663.

DESCRIPTION OF PREFERRED EMBODIMENTS

[1. First Embodiment: FIGS. 1 to 9B]

As a speaker system of the first embodiment of the invention, the case where laminated piezoelectric actuators are attached to the respective right and left plate parts of a display screen of a bezel as a structure is shown.

(1-1). Example of First Embodiment: FIGS. 1 to 6)

Figure 1:
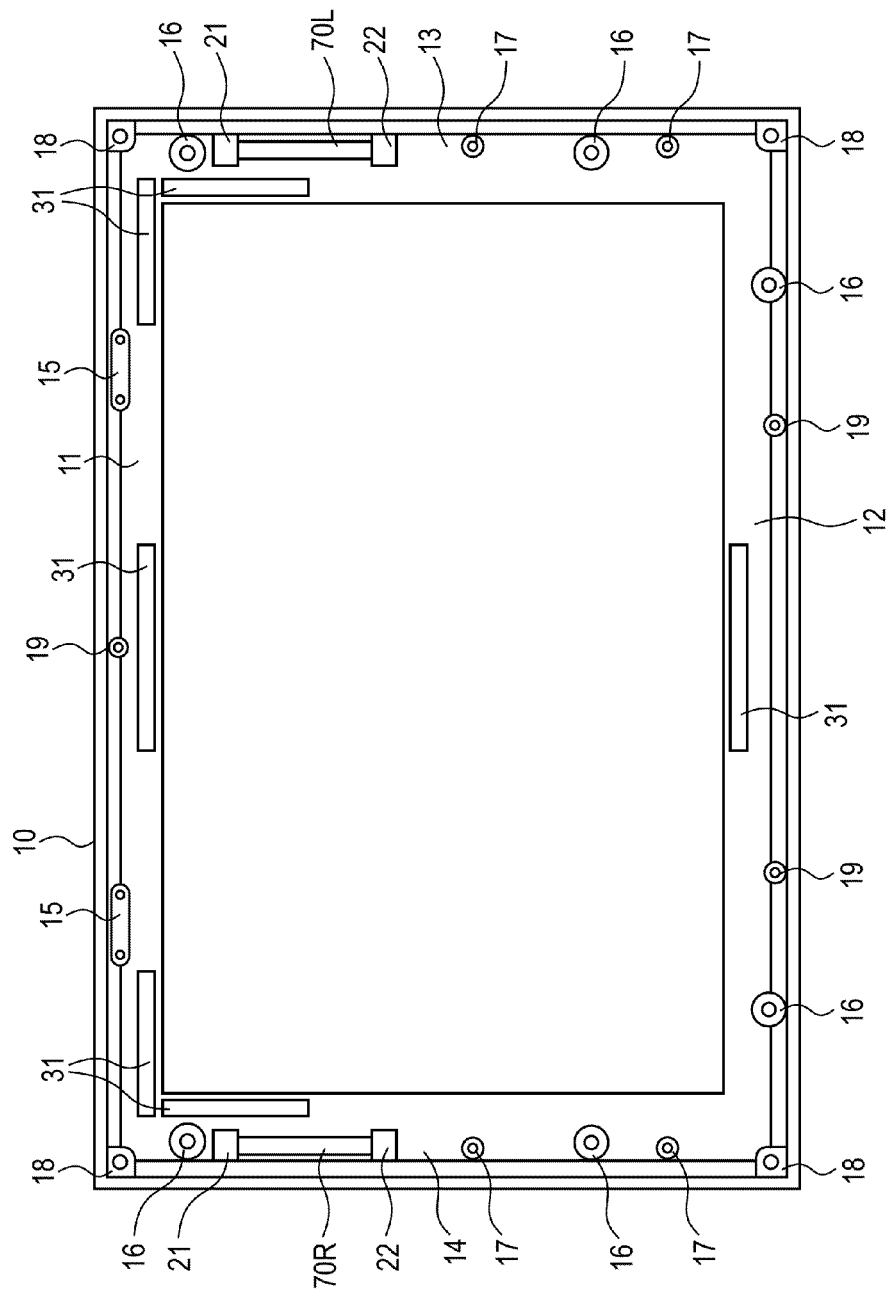
FIG. 1 shows a bezel of an example of a speaker system of the first embodiment seen from the rear side.
Figure 2:
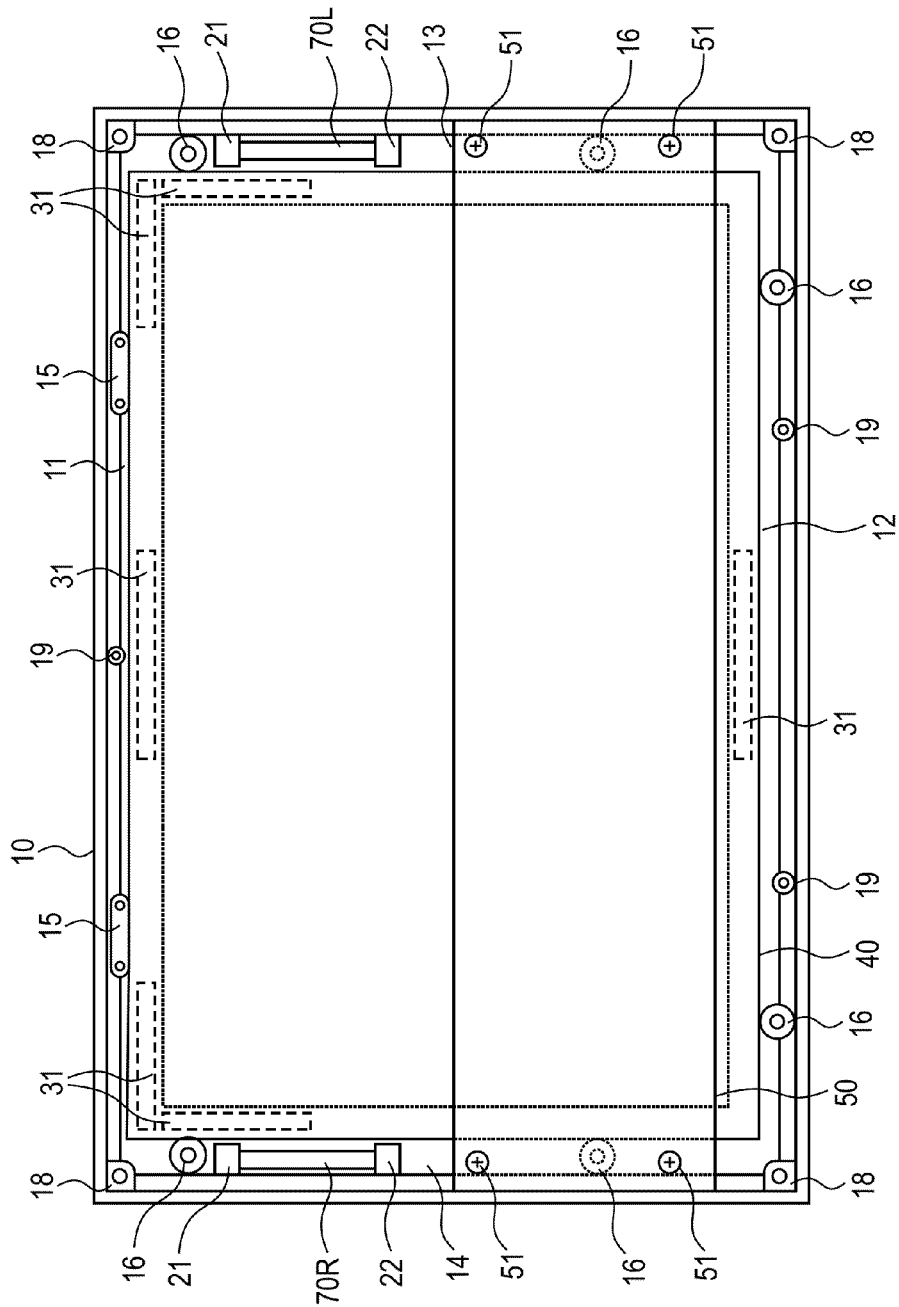
FIG. 2 shows the bezel and a display panel of the example of the speaker system of the first embodiment seen from the rear side.
Figure 3:
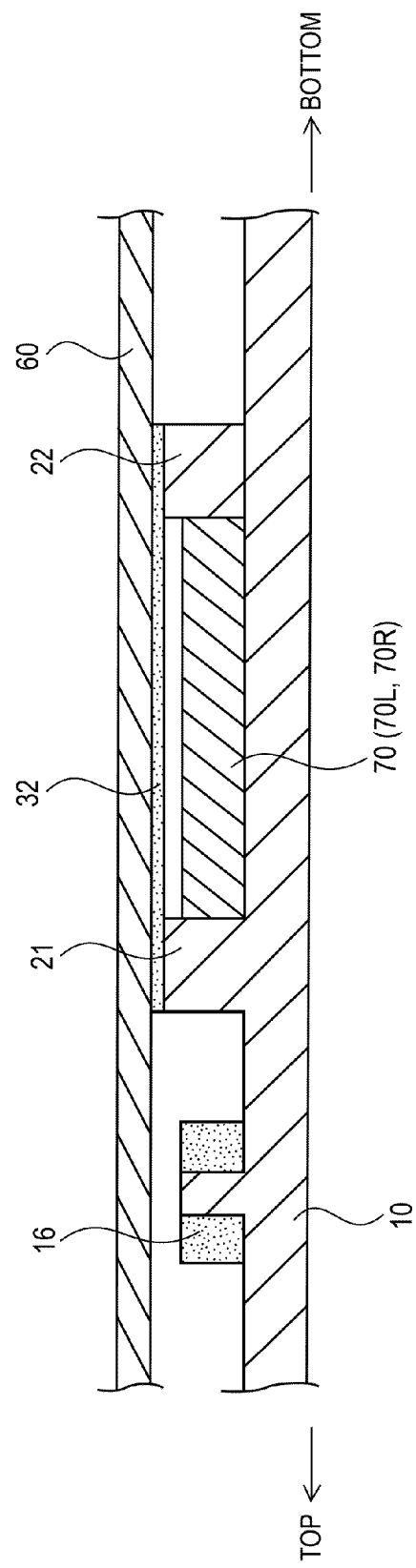
FIG. 3 shows a sectional structure along a center axis of a laminated piezoelectric actuator of the example of the speaker system of the first embodiment.

<1-1-1. Overall Configuration: FIGS. 1 to 3>

FIGS. 1, 2, and 3 show an example of the speaker system of the first embodiment.

FIG. 1 shows a bezel seen from the rear side, FIG. 2 shows the bezel supporting a display panel seen from the rear side, and FIG. 3 shows a section of an actuator attachment part in FIGS. 1 and 2.

Hereinafter, the upper side refers to the upper side of the display screen, the lower side refers to the lower side of the display screen, the left side refers to the left side of the display screen seen from the front side, and the right side refers to the right side of the display screen seen from the front side.

As shown in FIGS. 1 and 2, a bezel 10 has a casing board shape (frame shape) with an upper side plate part 11, a lower side plate part 12, a left side plate part 13, and a right side plate part 14.

It is desirable that the bezel 10 is made of a material with good acoustic characteristics to function as an acoustic diaphragm. For example, among metals, magnesium is preferable.

A strip-shaped rubber piece 15 is attached to the rear side of the upper side plate part 11, and ring-shaped rubber pieces 16 are attached to the rear side of the lower side plate part 12, the left side plate part 13, and the right side plate part 14.

On the rear side of the left side plate part 13 and the right side plate part 14, screw holes 17 for attaching the bezel 10 to a display panel 40 are formed.

On the rear side in the respective corners of the bezel 10 and the rear side of the upper side plate part 11 and the lower side plate part 12, screw hole portions 18 and 19 for attaching a rear cover 60 shown in FIG. 3 are formed.

Further, laminated piezoelectric actuators 70L and 70R are attached to the rear side of the left side plate part 13 and the right side plate part 14 of the bezel 10.

In this example, receiving portions 21 and 22 projecting toward the rear side are provided on the left side plate part 13, and the laminated piezoelectric actuator 70L is attached between the receiving portion 21 and the receiving portion 22 so that its displacement direction (vibration direction) may be the vertical direction of the screen.

Similarly, the receiving portions 21 and 22 projecting toward the rear side are provided on the right side plate part 14, and the laminated piezoelectric actuator 70R is attached between the receiving portion 21 and the receiving portion 22 so that its displacement direction (vibration direction) may be the vertical direction of the screen.

The receiving portions 21 and 22 are formed integrally with the bezel 10, or formed separately from the bezel 10 and attached to the bezel 10 using screws or an adhesive. The laminated piezoelectric actuators 70L and 70R are attached to the bezel 10 via an adhesive between the receiving portions 21 and 22, respectively, for example.

The vibration of the laminated piezoelectric actuators 70L and 70R is transmitted to the bezel 10 via the receiving portions 21 and 22, respectively, as longitudinal vibration along the surface. Thereby, sound wave is radiated in the front direction perpendicular to the surface of the bezel 10.

Accordingly, it is desirable that the receiving portions 21 and 22 are made of a hard material for efficient propagation of vibration.

Furthermore, tape-like buffer members 31 are attached using double-faced tapes or the like to the rear side of the upper side plate part 11, the lower side plate part 12, the left side plate part 13, and the right side plate part 14. As the buffer members 31, nonwoven fabric such as Himelon (product name) may be used.

The display panel 40 is a flat display panel such as an organic EL display panel, and displays images on the display screen.

A chassis 50 is attached to the rear side of the display panel 40. Though omitted in the drawing, a circuit board etc. are attached to the chassis 50.

As shown in FIG. 2, the display panel 40 to which the chassis 50 has been attached is inserted to the rear side of the bezel 10 such that display panel 40 is held between the rubber pieces 15 and 16, and the display panel 40 is supported by the bezel 10 by screwing screws 51 from the outside of the chassis 50 into the screw holes 17 shown in FIG. 1.

In this regard, the rubber pieces 15 and 16 slightly yield into elastic contact with the perimeter end surface of the display panel 40, and thereby, variations in relative positions in the surface direction of the display screen between the bezel 10 and the display panel 40 are absorbed and breakage of the display panel 40 on impact is prevented.

Further, the buffer members 31 intervene between the bezel 10 and the perimeter of the display panel 40, and thereby, the acoustic characteristics are improved as described later.

After the display panel 40 is supported by the bezel 10, the rear cover 60 is put on the rear side of the bezel 10 as shown in FIG. 3, and the rear cover 60 is attached to the bezel 10 by screwing the screws from the outside of the rear cover 60 into the screw hole portions 18 and 19 shown in FIG. 1.

In the case where the receiving portions 21 and 22 forming the actuator attachment part and the rear cover 60 are in close contact, buffer members 32 are attached to the receiving portions 21 and 22 as well and the buffer members 32 intervene between the receiving portions 21 and 22 and the rear cover 60.

Figure 4A:
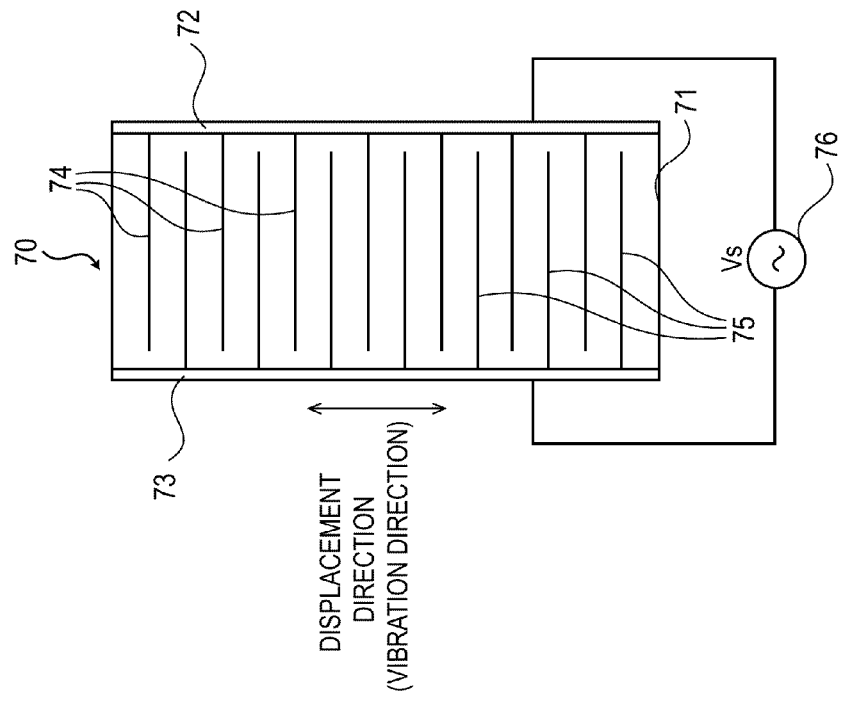
FIGS. 4A and 4B show an example of the laminated piezoelectric actuator.
Figure 4B:
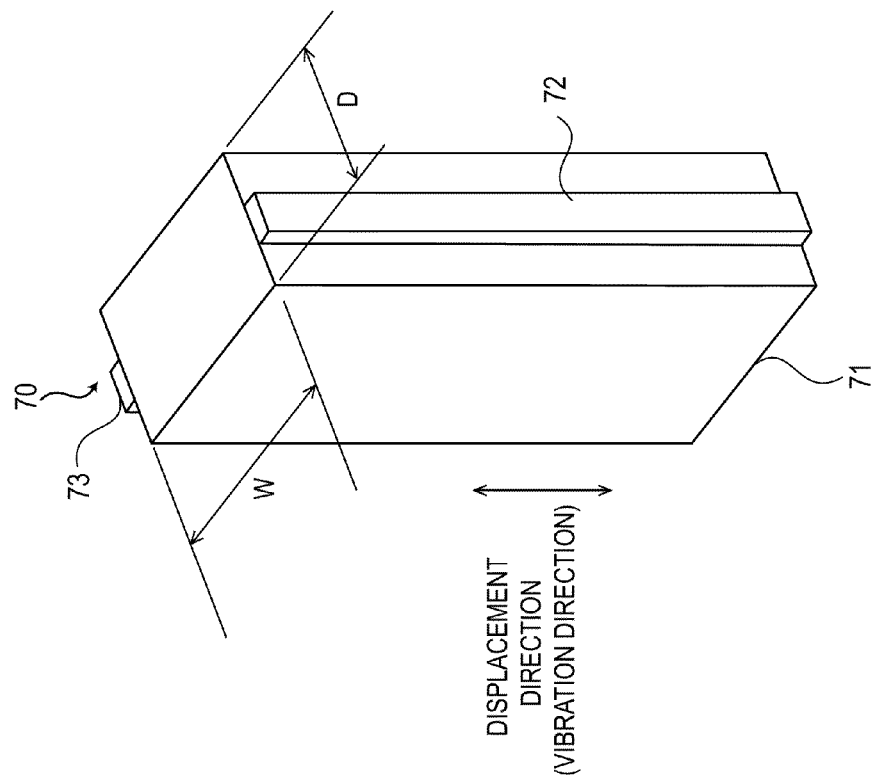

<1-1-2. Laminated Piezoelectric Actuator: FIGS. 4A and 4B>

FIGS. 4A and 4B show an example of a laminated piezoelectric actuator used as the laminated piezoelectric actuator 70L or 70R. FIG. 4A is a schematic perspective view and FIG. 4B is a schematic sectional view.

In the laminated piezoelectric actuator in this example, external electrodes 72 and 73 are formed on opposed side surfaces of a piezoelectric ceramic thin plate laminate 71.

In the piezoelectric ceramic thin plate laminate 71, many piezoelectric ceramic thin plates are laminated with internal electrodes 74 and 75 alternately in between. The internal electrodes 74 are connected to the external electrode 72 and the internal electrodes 75 are connected to the external electrode 73.

When a signal voltage Vs obtained from a signal source 76 is applied between the external electrodes 72 and 73, the individual piezoelectric ceramic thin plates are displaced due to polarization in the thickness direction, and the piezoelectric ceramic thin plate laminate 71 is displaced and vibrates in the lamination direction by the sum of the respective displacements.

The laminated piezoelectric actuators may have a width W of about 3.5 mm in the direction in which the external electrodes 72 and 73 are opposed and a depth D of about 2 mm.

Accordingly, the laminated piezoelectric actuators are attached to the bezel 10 so that the direction of the width W may be in parallel to the display screen and the direction of the depth D may be perpendicular to the display screen.

Thereby, in the speaker system in the example of FIGS. 1 to 3, the thickness may be set to several millimeters or less.

As described above, a magnetic bias is not necessary for the laminated piezoelectric actuator unlike the super-magnetostrictive actuator, and the simpler and smaller actuator can be formed.

In addition, the laminated piezoelectric actuator generates a large stress and provides a high response speed like the super-magnetostrictive actuator.

Figure 6:
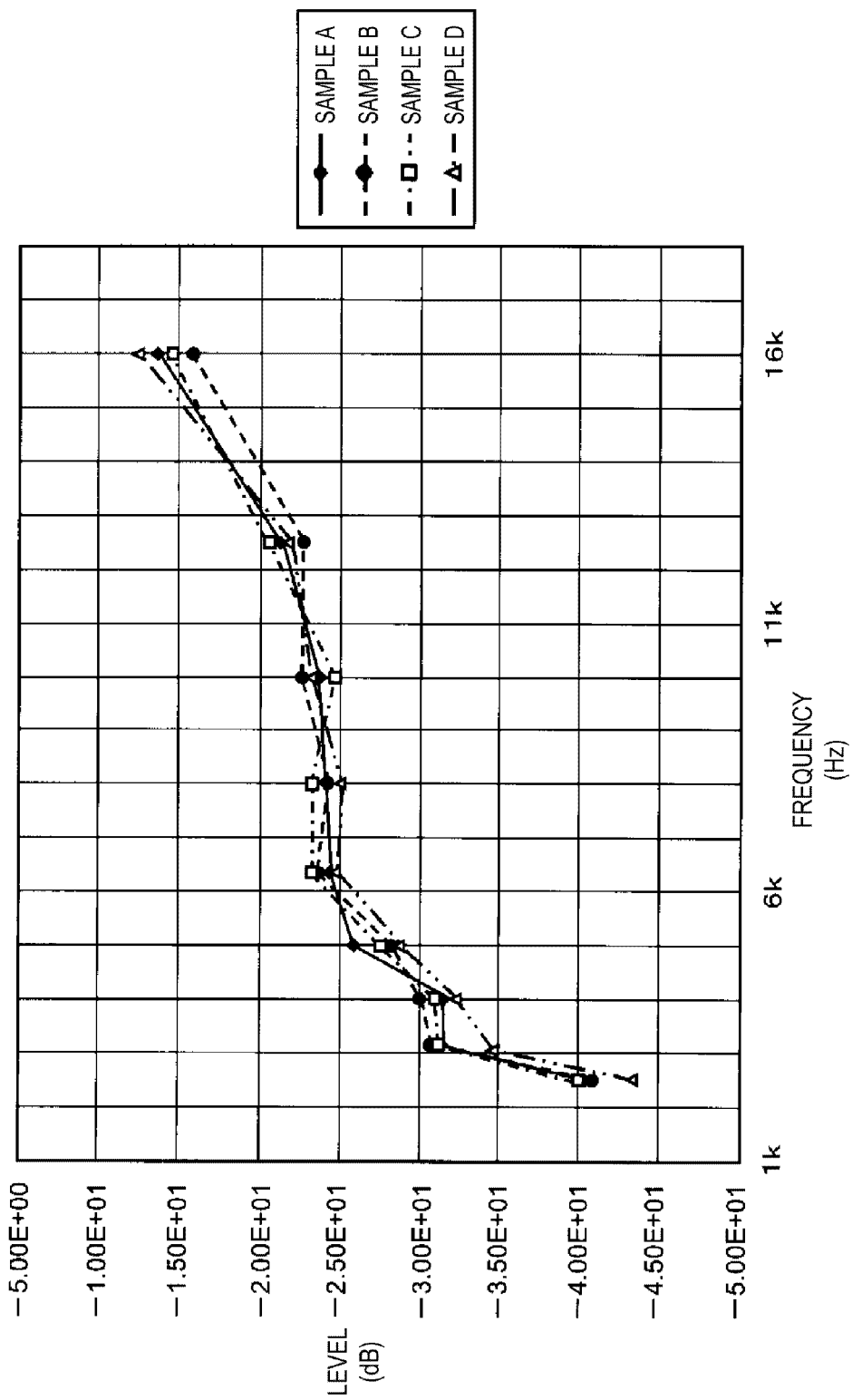
FIG. 6 shows the case where differences in frequency characteristics depending on individual differences of the bezel are small.

<1-1-3. Operation: FIGS. 5 and 6>

In the speaker system in the example of FIGS. 1 to 3, as described above, the vibration of the laminated piezoelectric actuators 70L and 70R is transmitted to the bezel 10 as longitudinal vibration and sound wave is radiated in the front direction perpendicular to the surface of the bezel 10.

Further, the buffer members 31 intervene between the bezel 10 and the perimeter of the display panel 40, and thereby, variations in acoustic characteristics depending on individual differences of the bezel 10 are absorbed and the acoustic characteristics are improved as below.

FIG. 5 shows differences in frequency characteristics of sound pressure level depending on individual differences of the bezel 10 when no buffer member 31 exists and the bezel 10 is in direct contact with the perimeter of the display panel 40.

Sample A, sample B, sample C, and sample D are four bezels manufactured from the same material (magnesium) by the same manufacturing method in the same size, and they are slightly different in warpage.

In this case, the frequency characteristics of sound pressure level vary depending on individual differences of the bezel, and further, in sample A, significant reduction of the sound pressure level is recognized around 8 kHz.

On the other hand, FIG. 6 shows the case where the buffer members 31 intervene between the bezel 10 and the perimeter of the display panel 40 as in the above described example.

In this case, transmission of the vibration of the bezel 10 to the display panel 40 is blocked, and thereby, the differences in frequency characteristics of sound pressure level depending on individual differences of the bezel 10 become remarkably smaller, and any significant reduction of the sound pressure level of a certain sample is not recognized around a certain frequency in the middle to high frequency range.

Note that the laminated piezoelectric actuator is capacitive. Accordingly, when the laminated piezoelectric actuators 70L and 70R are attached to the bezel 10 as in the example in FIGS. 1 to 3, the sound pressure level becomes higher as the frequency becomes higher in the high frequency range as shown in FIGS. 5 and 6. This may be addressed as described below.

<1-1-4. Driving Method>

In the speaker system in the example of FIGS. 1 to 3, the laminated piezoelectric actuators 70L and 70R can be driven using the same sound signal.

Further, the laminated piezoelectric actuators 70L and 70R may be driven using separate sound signals by driving the laminated piezoelectric actuator 70L by a left-channel signal of a stereo sound signal and driving the laminated piezoelectric actuator 70R by a right-channel signal of the stereo sound signal.

Furthermore, the laminated piezoelectric actuators 70L and 70R may be driven using a middle-to-high-frequency component of the sound signal as described below.

In either case, a sound image is localized at the outside of the left side and the outside of the right side of the display screen in view of auditory sensation.

(1-2. Example of Pre-load Application: FIGS. 7A to 7C)

In the speaker system in the example of FIGS. 1 to 3, for instance, in the case where the bezel 10 is formed of a metal such as magnesium, when the bezel 10 expands due to temperature rise, the laminated piezoelectric actuators 70L and 70R are stretched.

However, the piezoelectric element is mechanically weak to tension. Accordingly, it is desirable that pre-loads are applied to the laminated piezoelectric actuators 70L and 70R. When the pre-loads are applied to the laminated piezoelectric actuators 70L and 70R, the sound quality is also improved.

For the purpose, it is desirable that the pre-loads are applied to the laminated piezoelectric actuators 70L and 70R using eccentric cam rings, circular disk cams or the like in the actuator attachment part.

FIGS. 7A to 7C show an example thereof. FIGS. 7A, 7B, 7C show the left side plate part and the right side plate part of the bezel 10 seen from the rear side.

In this example, a receiving portion 24 has a shape into which one end of the laminated piezoelectric actuator is inserted from above, and one end of the laminated piezoelectric actuator is inserted into the receiving portion 24.

After one end of the laminated piezoelectric actuator is inserted into the receiving portion 24, as shown FIG. 7A, an eccentric cam ring 23 is attached to a shaft 23a of the bezel 10 in a location at the other end of the laminated piezoelectric actuator.

From the state, through the state in FIG. 7B, the eccentric cam ring 23 is rotated to push the laminated piezoelectric actuator in the displacement direction (vibration direction) as shown in FIG. 7C.

After adjustment, the eccentric cam ring 23 may be fixed to the bezel 10 using an adhesive or the like so as not to rotate relative to the adjusted rotational position due to external vibration or impact.

(1-3. Another Example of Actuator Attachment Part: FIGS. 8A and 8B and 9A and 9B)

The actuator attachment part of the bezel 10 may be formed as below.

Figure 8A:
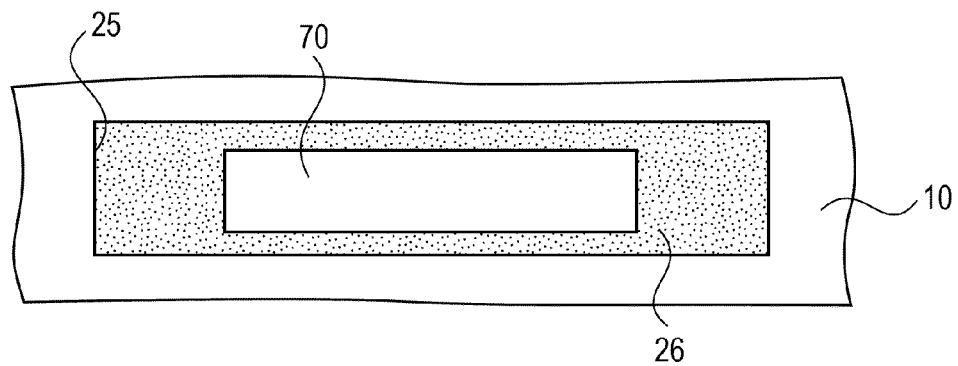
FIGS. 8A and 8B show another example of an actuator attachment configuration of the speaker system of the first embodiment.
Figure 8B:
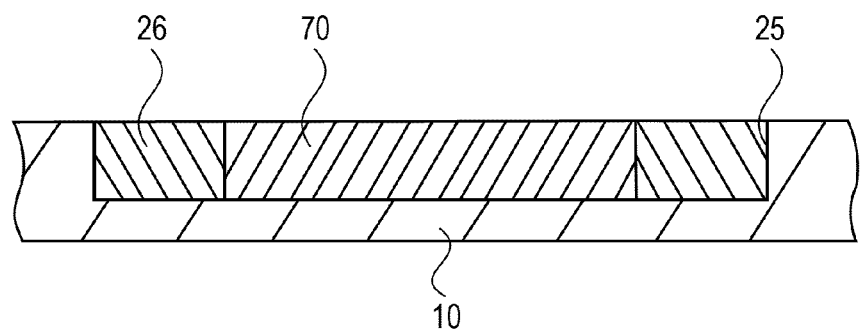

FIGS. 8A and 8B show an example of the part. FIG. 8A shows the left side plate part and the right side plate part of the bezel 10 seen from the rear side, and FIG. 8B is a sectional view thereof.

In this example, grooves 25 are formed on the rear side of the left side plate part and the right side plate part of the bezel 10 and the laminated piezoelectric actuators are attached into the grooves 25 using an adhesive 26.

In order to efficiently transmit the vibrator of the laminated piezoelectric actuator to the bezel 10, the adhesive 26 is desirably a hard material.

Figure 9A:
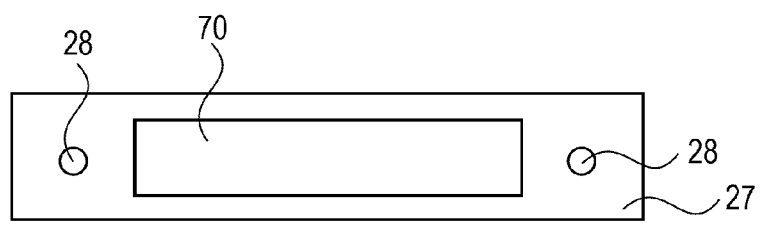
FIGS. 9A and 9B show another example of the actuator attachment configuration of the speaker system of the first embodiment.
Figure 9B:
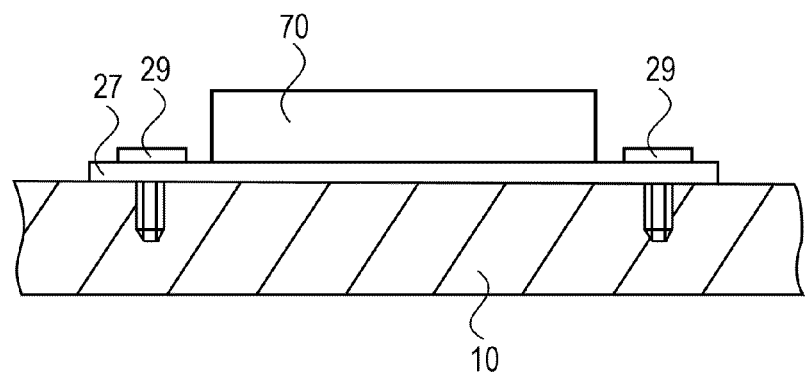

FIGS. 9A and 9B show another example. FIG. 9A shows an actuator attachment plate onto which the laminated piezoelectric actuator is attached, and FIG. 9B is a side view with the section of the bezel part.

In this example, an actuator attachment plate 27 in which holes 28 for screws are formed is prepared separately from the bezel 10, and the laminated piezoelectric actuator is attached to the plate using an adhesive, double-faced tape, or the like.

The actuator attachment plates 27 on which the laminated piezoelectric actuators have been attached are attached to the rear side of the left side plate part and the right side plate part of the bezel 10 using screws 29.

In this example, the laminated piezoelectric actuators are used as adapters, and thereby, the laminated piezoelectric actuators can be efficiently attached to the bezel 10 and productivity of speaker system is improved.

Figure 11:
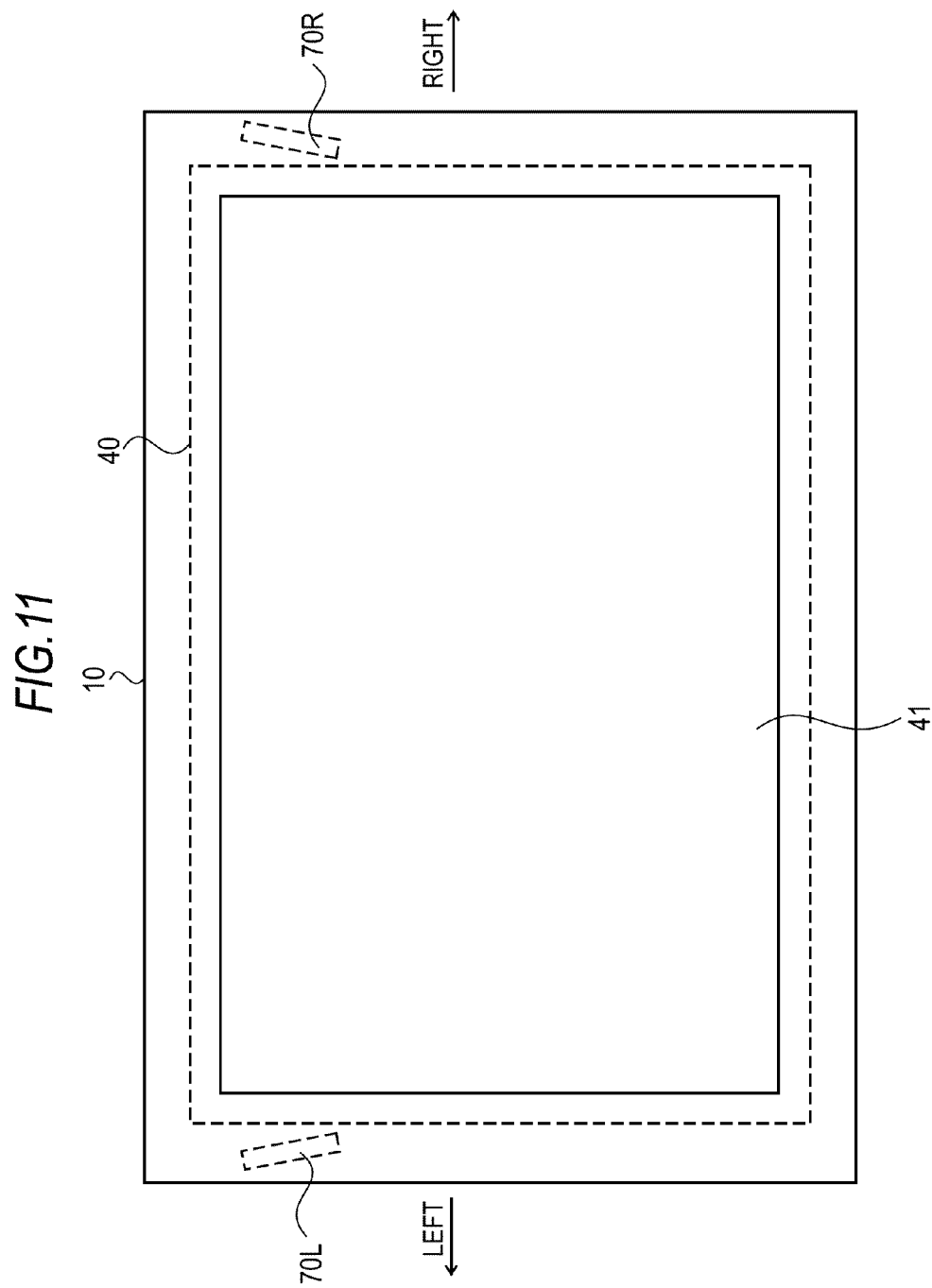
FIG. 11 shows an example of a speaker system of the second embodiment.

[2. Second Embodiment: FIGS. 10A and 10B and 11]

In the above described first embodiment, as shown in FIG. 10A, an angle α relative to an extension direction (horizontal direction of the screen) of the end surface 10a of the bezel 10 in the displacement direction (vibration direction) of the laminated piezoelectric actuator shown by an arrow 79 is a right angle.

Accordingly, the longitudinal wave propagating from the vibration application point Pa of the bezel 10 to the point Pr on the end surface 10a is reflected at the point Pr in the displacement direction of the laminated piezoelectric actuator, and resonance occurs between the longitudinal wave propagating to the point Pr and the longitudinal wave reflected at the point Pr. The same is true with the opposite end surface to the end surface 10a.

On the other hand, in the second embodiment, as shown in FIG. 10B, the angle relative to an extension direction (horizontal direction of the screen) of the end surface 10a of the bezel 10 in the displacement direction (vibration direction) of the laminated piezoelectric actuator shown by an arrow 79 is not a right angle but an angle between 0° and 90°.

Thereby, the longitudinal wave propagating from the vibration application point to the point on the end surface 10a is mainly reflected at the point on the end surface 10a in a direction different from the displacement direction of the laminated piezoelectric actuator, and resonance by the reflected wave is reduced. The same is true with the opposite end surface to the end surface 10a.

FIG. 11 shows an example of a speaker system of the second embodiment. FIG. 11 shows the speaker system seen from the front side and laminated piezoelectric actuators by broken lines.

In this example, the laminated piezoelectric actuator 70L is attached to the rear side of the left side plate part of the bezel 10 with the displacement direction at a tilt to some degree relative to the vertical direction of the screen, and the laminated piezoelectric actuator 70R is attached to the rear side of the right side plate part of the bezel 10 symmetrically relative to the laminated piezoelectric actuator 70L.

Figure 12:
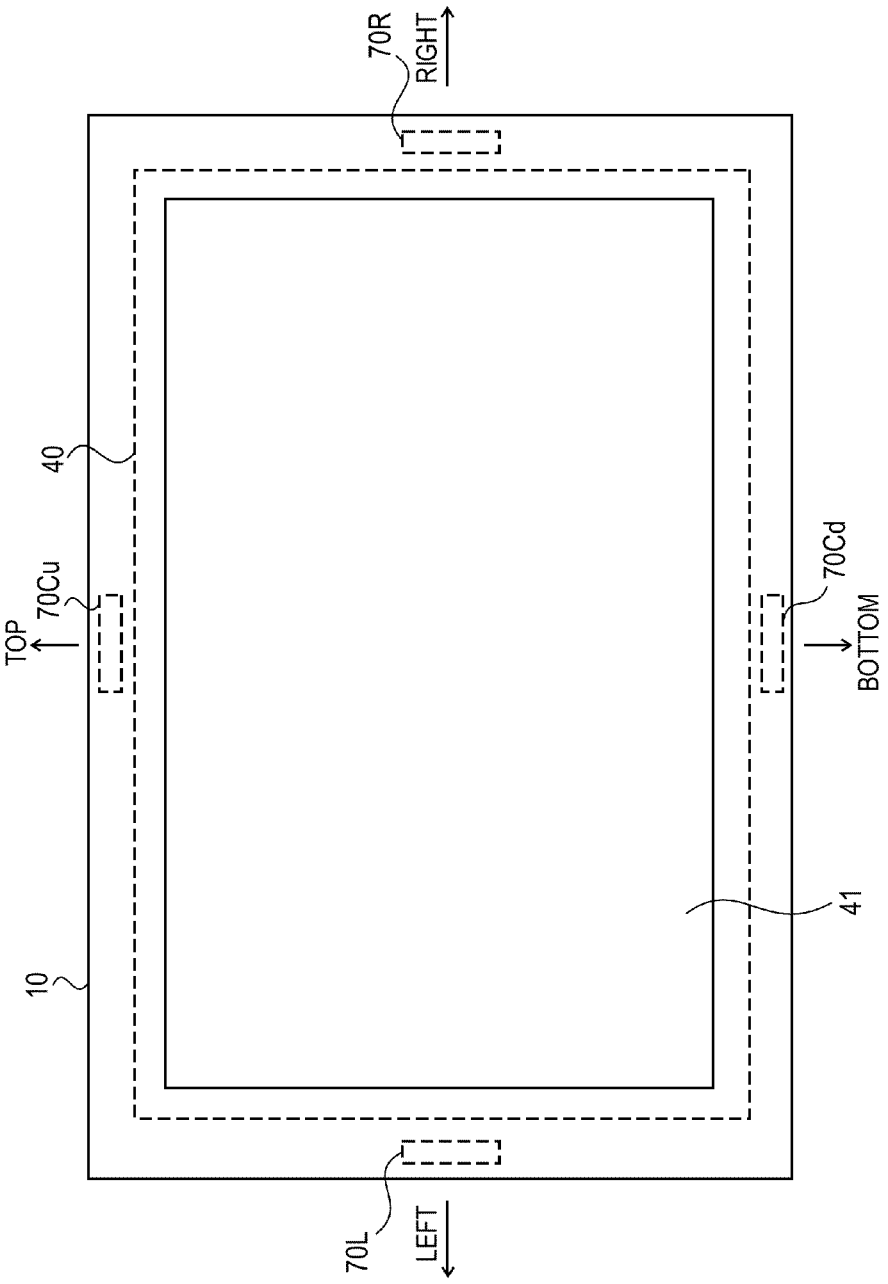
FIG. 12 shows an example of a speaker system of the third embodiment.
Figure 13:
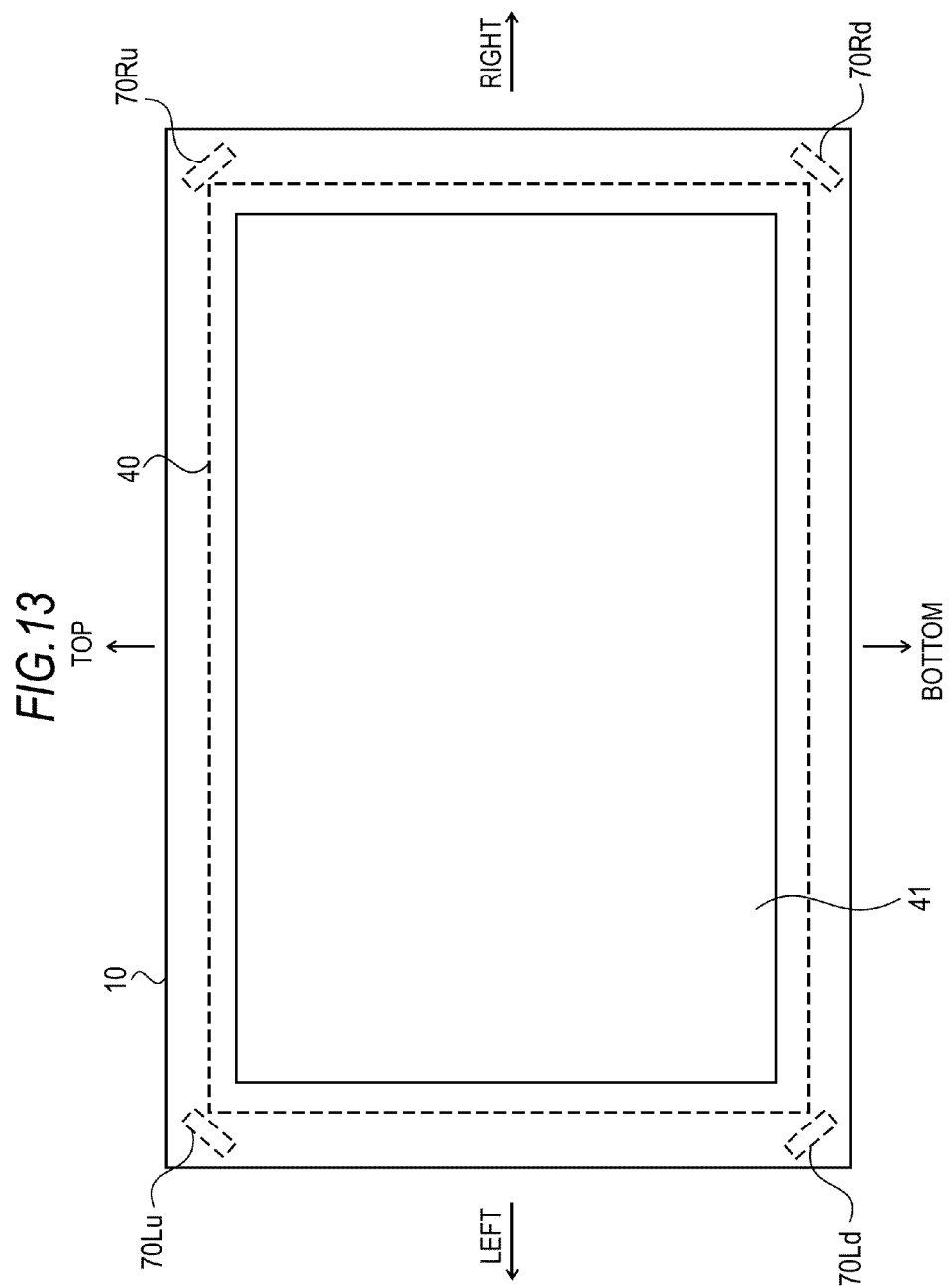
FIG. 13 shows another example of the speaker system of the third embodiment.

[3. Third Embodiment: FIGS. 12 and 13]

As a speaker system of the third embodiment of the invention, the case where four laminated piezoelectric actuators are attached to a bezel is shown.

(3-1. Example of Third Embodiment: FIG. 12)

FIG. 12 shows an example of the speaker system of the third embodiment, and shows the speaker system seen from the front side like FIG. 11.

In this example, the laminated piezoelectric actuator 70L is attached to the rear side at the center of the left side plate part of the bezel 10 in the vertical direction of the screen, and the laminated piezoelectric actuator 70R is attached to the rear side at the center of the right side plate part of the bezel 10 in the vertical direction of the screen.

Further, a laminated piezoelectric actuator Cu is attached to the rear side at the center of the upper side plate part of the bezel 10 in the vertical direction of the screen, and a laminated piezoelectric actuator Cd is attached to the rear side at the center of the lower side plate part of the bezel 10 in the vertical direction of the screen.

In this example, a sound image can be moved and localized in conjunction with the movement of an object or the like displayed on a display screen 41 by controlling the levels and phases of the sound signals supplied to the individual laminated piezoelectric actuators.

For instance, the level of the signal supplied to the laminated piezoelectric actuator 70L and the level of the signal supplied to the laminated piezoelectric actuator 70R are made equal, and the level of the signal supplied to the laminated piezoelectric actuator Cu is made higher than the level of the signal supplied to the laminated piezoelectric actuator Cd. Thereby, the sound image can be localized in an upper location in the vertical direction at the center in the horizontal direction of the display screen 41.

(3-2. Another Example of Third Embodiment: FIG. 13)

FIG. 13 shows another example of the speaker system of the third embodiment, and shows the speaker system seen from the front side like FIG. 12.

In this example, a laminated piezoelectric actuator 70Lu is attached to the rear side in the upper left corner part of the bezel 10 with its displacement direction tilted at 45° relative to the screen horizontal direction and the screen vertical direction, and a laminated piezoelectric actuator 70Ld is attached to the rear side in the lower left corner part of the bezel 10 vertically symmetric relative to the laminated piezoelectric actuator 70Lu.

Further, laminated piezoelectric actuators 70Ru and 70Rd are attached to the rear side in the upper right corner part and the lower right corner part of the bezel 10 horizontally symmetric relative to the laminated piezoelectric actuators 70Lu and 70Ld, respectively.

In this example, similarly, a sound image can be moved and localized in conjunction with the movement of an object or the like displayed on the display screen 41 by controlling the levels and phases of the sound signals supplied to the individual laminated piezoelectric actuators.

For instance, the levels of the signals supplied to the laminated piezoelectric actuators 70Lu and 70Ru are made higher and the levels of the signals supplied to the laminated piezoelectric actuators 70Ld and 70Rd are made lower. Thereby, the sound image can be localized in an upper location in the vertical direction at the center in the horizontal direction of the display screen 41.

Furthermore, in this example, the angles relative to the extension directions of the end surface 10*a* of the bezel 10 of the in the displacement directions (vibration directions) of the respective laminated piezoelectric actuators are 45°, and therefore, as an example of the above described embodiment, resonance due to reflected wave is reduced.

Figure 14:
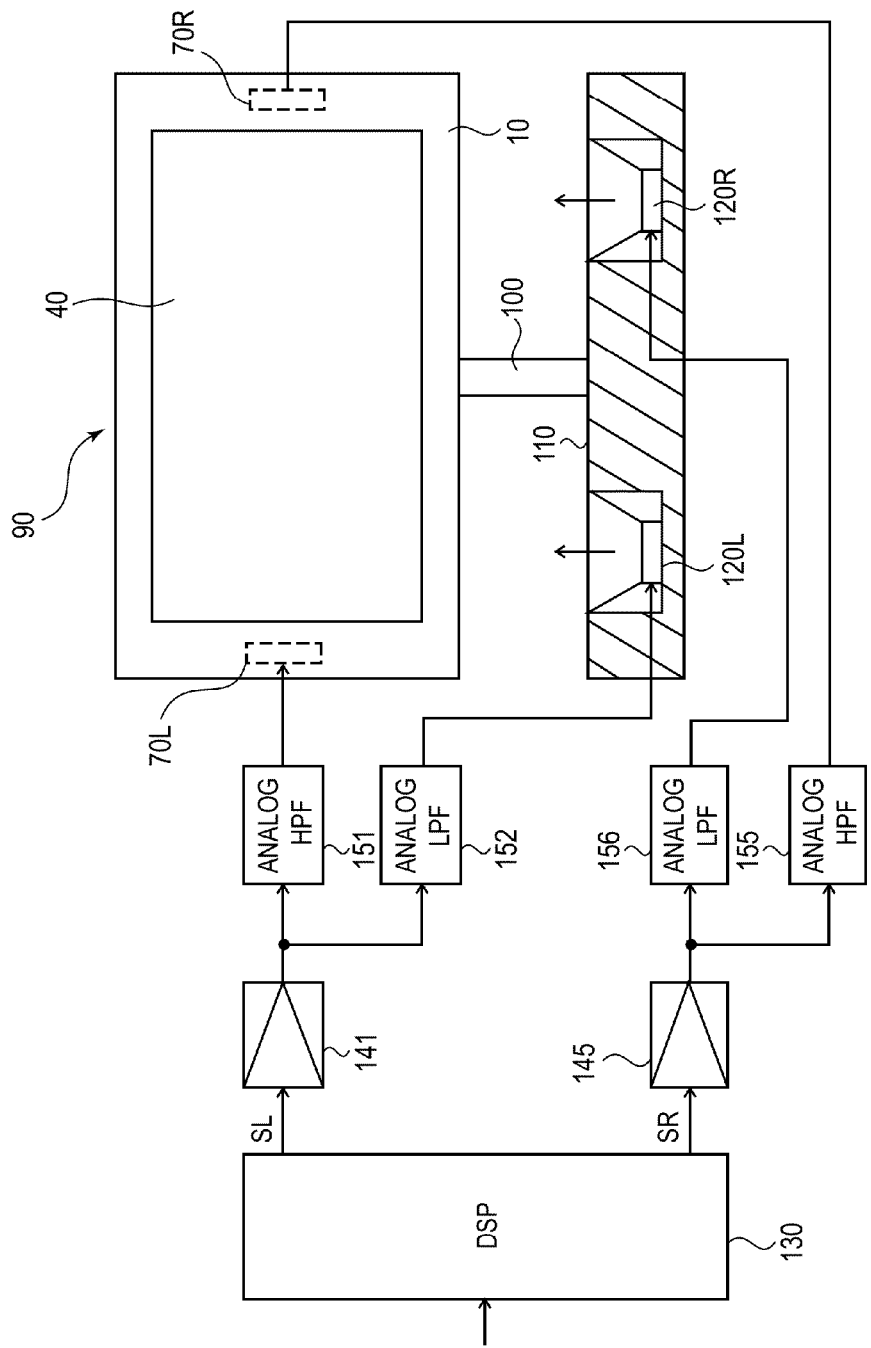
FIG. 14 shows an example of a speaker system of the fourth embodiment.

[4. Fourth Embodiment: FIGS. 14 to 16]

As a speaker system of the fourth embodiment of the invention, not only the actuators are attached to a display panel part as described above, but also a typical speaker unit can be provided at the same time.

(4-1. Example of Fourth Embodiment: FIGS. 14 and 15)

FIG. 14 shows an example of the speaker system of the fourth embodiment. In this example, a display panel part 90 is mounted on a pedestal box 110 using a columnar support 100.

In the display panel part 90, as in the speaker system in the example of FIGS. 1 to 3, the laminated piezoelectric actuators 70L and 70R are attached to the rear side of the left side plate part and the right side plate part of the bezel 10.

Typical speaker units 120L and 120R respectively having voice coils and cones are attached to the right and left locations seen from the front side of the pedestal box 110 with the speaker front surfaces directed upward.

In this example, the vibration speaker formed by the laminated piezoelectric actuators 70L and 70R and the bezel 10 functions as a tweeter and the typical speaker units 120L and 120R functions as woofers.

In this case, the tweeter band shows a frequency response peculiar to the configuration of the vibration speaker, and the frequency characteristic is corrected by a DSP (Digital Signal Processor) according to need.

Specifically, a left-channel signal SL and a right-channel signal SR of the stereo sound signal that have been digitally processed for frequency correction and converted into analog signals are obtained from a DSP 130.

The left-channel signal SL is amplified by a sound amplifier circuit 141, and then, separated into a middle-to-high-frequency component and a low-frequency component by an analog HPF (high-pass filter) 151 and an analog LPF (low-pass filter) 152.

The signal of the middle-to-high-frequency component of the left channel from the analog HPF 151 is supplied to the laminated piezoelectric actuator 70L, and the signal of the low-frequency component of the left channel from the analog LPF 152 is supplied to the speaker unit 120L.

On the other hand, the right-channel signal SR is amplified by a sound amplifier circuit 145, and then, separated into a middle-to-high-frequency component and a low-frequency component by an analog HPF (high-pass filter) 155 and an analog LPF (low-pass filter) 156.

The signal of the middle-to-high-frequency component of the right channel from the analog HPF 155 is supplied to the laminated piezoelectric actuator 70R, and the signal of the low-frequency component of the right channel from the analog LPF 156 is supplied to the speaker unit 120R.

The laminated piezoelectric actuators 70L and 70R are driven by voltages and the speaker units 120L and 120R are driven by currents. Accordingly, the entire speaker system is designed by selecting DCRs (direct-current resistors) of the speaker units 120L and 120R so that sound pressure may be matched between the laminated piezoelectric actuators 70L and 70R side and the speaker units 120L and 120R side and otherwise.

The frequency characteristics of the analog LPFs 152 and 156 are flat in the low frequency range as shown in FIG. 15A.

The frequency characteristics of the analog HPFs 151 and 155 are, when the sound pressure level becomes higher as the frequency becomes higher in the high frequency range as shown in FIGS. 5 and 6, characteristics that are not flat in the middle-to-high frequency range as shown by a broken line in FIG. 15B and the pass level becomes lower as the frequency becomes higher in the middle-to-high frequency range as shown by a solid line in FIG. 15B.

Note that the processing of reducing the level in the high frequency range may be performed not only by the analog HPFs 151 and 155 but by the DSP 130 at the upstream.

(4-2. Another Example of Fourth Embodiment: FIG. 16)

FIG. 16 shows another example of the speaker system of the fourth embodiment. This example is the same as the example of FIG. 14 except the method of driving speakers.

As the method of driving speakers, in this example, in the DSP 130, the signal of the middle-to-high-frequency component of the left channel, the signal of the low-frequency component of the left channel, the signal of the middle-to-high-frequency component of the right channel, and the signal of the low-frequency component of the right channel are separately processed.

The signal of the middle-to-high-frequency component of the left channel is digitally processed in the DSP 130, and then, converted into an analog signal SLH by the DSP 130, amplified by a sound amplifier circuit 161, and supplied to the laminated piezoelectric actuator 70L.

The signal of the low-frequency component of the left channel is digitally processed in the DSP 130, and then, converted into an analog signal SLL by the DSP 130, amplified by a sound amplifier circuit 162, and supplied to the speaker unit 120L.

The signal of the middle-to-high-frequency component of the right channel is digitally processed in the DSP 130, and then, converted into an analog signal SRH by the DSP 130, amplified by a sound amplifier circuit 165, and supplied to the laminated piezoelectric actuator 70R.

The signal of the low-frequency component of the right channel is digitally processed in the DSP 130, and then, converted into an analog signal SRL by the DSP 130, amplified by a sound amplifier circuit 166, and supplied to the speaker unit 120R.

In this example, the processing of reducing the level in the high frequency range as shown in FIG. 15B is performed in the DSP 130.

In this example, for instance, the sound image signal localization effect on the display screen due to the Haas effect can be improved by delaying the signals of the low-frequency components with a time difference of about several milliseconds to several tens of milliseconds between the signals supplied to the laminated piezoelectric actuators 70L and 70R and the signals supplied to the speaker units 120L and 120R.

[5. Another Embodiment or Example: FIGS. 17A and 17B]

(5-1. Regarding Structure: FIGS. 17A and 17B)

In the above described respective examples, the structure functioning as an acoustic diaphragm is the bezel 10 having a casing board shape (frame shape), however, the structure may not necessarily have the casing board shape.

FIGS. 17A and 17B show an example in which the structure does not have the casing board shape, but has a rectangular flat board shape. FIG. 17A shows a speaker system seen from the front side, and FIG. 17B shows a cross section along a line Y in FIG. 17A.

In this example, a transparent rectangular flat board of an acryl board is provided as a front panel 80, and the display panel 40 and the laminated piezoelectric actuators 70L and 70R are attached to the rear side thereof. The laminated piezoelectric actuators 70L and 70R are attached to the front panel 80 at the left side and the right side of the display screen 41.

In this case, it is necessary that the part in front of the display screen 41 of the front panel 80 is transparent, however, if the surrounding parts on the top, bottom, right, and left thereof are transparent, the appearance is poor because the laminated piezoelectric actuators 70L and 70R are seen from the front side.

Accordingly, a film 81 for making the parts opaque is formed on the parts surrounding the display screen 41 on the front surface of the front panel 80.

(5-2. Regarding Actuators)

In the above described respective examples, the laminated piezoelectric actuators are used as actuators, however, supermagnetostrictive actuators, static actuators, or the like may be used as actuators.

Further, as the attachment configuration of the actuators, for instance, rectangular holes may be formed in the bezel and actuators may be fit in the rectangular holes, and vibration in the surface direction is applied to the bezel.

(5-3. Regarding Method of Driving Speakers)

As the method of driving speakers, other driving methods than the above described driving method may be used according to the number and attachment locations of actuators, and the number and arrangement locations of speaker units when typical speaker units are provided.

The present application contains subject matter related to that disclosed in Japanese Priority Patent Applications JP 2008-230391 and JP 2008-323420 filed in the Japan Patent Office on Sep. 9, 2008 and Dec. 19, 2008, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A speaker system comprising: a display panel having a display screen; a structure having a plate part comprising an acoustic diaphragm, the plate part being located outside of a perimeter of the display screen and being supported by the display panel; a speaker unit having a voice coil and a cone; and an actuator constructed and arranged to vibrate the acoustic diaphragm, wherein the actuator is attached to the structure so that a vibration direction of the actuator is in a direction along a surface of the plate part, wherein: a buffer member intervenes between the structure and a perimeter part of the display panel, and the actuator comprises a plurality of piezoelectric elements laminated with electrodes alternately in-between.

2. The speaker system according to claim 1, wherein the structure has a casing board shape.

3. The speaker system according to claim 1, wherein the structure has a front panel transparent at least in a part facing the display screen.

4. The speaker system according to claim 1, wherein the actuator is at least one actuator, and wherein each of the at least one actuators is attached to one of at least one location at a left side and a right side of the display screen and the structure.

5. The speaker system according to claim 4, wherein the vibration direction of each actuator is in the vertical direction of the display screen.

6. The speaker system according to claim 4, wherein the vibration direction of each actuator is at an angle relative to the vertical direction of the display screen.

7. The speaker system according to claim 4, wherein at least one actuator is attached to one of at least one second location at the upper side and the lower side of the display screen and the structure.

8. The speaker system according to claim 1, further comprising means for applying a pre-load to the laminated piezoelectric actuator.

9. The speaker system according to claim 1, wherein the actuator comprises a left-channel actuator and a right-channel actuator attached to locations at a left side and a right side of the display screen and the structure, and wherein the speaker unit comprises a left-channel speaker unit and a right-channel speaker unit.

10. A method of driving the speaker system according to claim 1, comprising the act of: driving the actuator by a sound signal containing at least a high-frequency component to localize a sound image at the outside of the perimeter of the display screen.

11. A method of driving the speaker system according to claim 1, comprising the acts of: driving the actuator by a sound signal having a middle-to high-frequency component; and driving the speaker unit by a sound signal having a low-frequency component.

12. The speaker driving method according to claim 11, wherein the sound signal of the middle- to high-frequency component is supplied to the actuator through a filter in which a pass level becomes lower as a frequency becomes higher.

13. A speaker system comprising: a display panel having a display screen; a structure having a plate part comprising an acoustic diaphragm, the plate part being located outside of a perimeter of the display screen and being supported by the display panel; an actuator constructed and arranged to vibrate the acoustic diaphragm, wherein the actuator is attached to the structure so that a vibration direction of the actuator is in a direction along a surface of the plate part; a speaker unit having a voice coil and a cone; and a pre-load applier that is constructed and arranged to apply a non-zero pre-load to the actuator, wherein: a buffer member intervenes between the structure and a perimeter part of the display panel, and the actuator comprises a plurality of piezoelectric elements laminated with electrodes alternately in-between.

14. The speaker system according to claim 13, wherein the preload applier comprises an eccentric cam ring.

15. The speaker system according to claim 13, wherein the preload applier is constructed and arranged to apply a compressive pre-load to the actuator.

16. The speaker driving method according to claim 11, further comprising the act of: applying a non-zero pre-load to the actuator.

17. The speaker system according to claim 1, wherein the vibration direction of the actuator is only in a direction along a surface of the plate part.

* * * * *